United States Patent
Eisenberg

(10) Patent No.: US 10,150,626 B2
(45) Date of Patent: Dec. 11, 2018

(54) GOODS TO OPERATOR WORKSTATION

(71) Applicant: Intelligrated Headquarters, LLC, Mason, OH (US)

(72) Inventor: Brett Logan Eisenberg, Woodbine, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/623,844

(22) Filed: Jun. 15, 2017

(65) Prior Publication Data

US 2017/0362039 A1    Dec. 21, 2017

Related U.S. Application Data

(60) Provisional application No. 62/350,709, filed on Jun. 15, 2016.

(51) Int. Cl.

| | |
|---|---|
| B65G 47/46 | (2006.01) |
| B65G 65/02 | (2006.01) |
| B65G 21/14 | (2006.01) |
| B65G 47/53 | (2006.01) |
| B65G 1/137 | (2006.01) |
| B65G 47/64 | (2006.01) |
| B65G 1/04 | (2006.01) |

(52) U.S. Cl.
CPC ........... *B65G 47/46* (2013.01); *B65G 1/0485* (2013.01); *B65G 47/643* (2013.01); *B65G 65/02* (2013.01); *B65G 1/1378* (2013.01); *B65G 21/14* (2013.01); *B65G 47/53* (2013.01)

(58) Field of Classification Search
CPC ...... B65G 65/02; B65G 47/46; B65G 1/1378; B65B 67/02
USPC ......................................................... 198/346
See application file for complete search history.

(56) References Cited

U.S. PATENT DOCUMENTS 4,909,697 A * 3/1990 Bernard, II .......... B65G 1/0485
                                                    187/255
6,134,862 A * 10/2000 Francois ............... B65G 65/23
                                                    254/8 R (Continued)

FOREIGN PATENT DOCUMENTS

| DE | 3909415 A1 | 9/1990 |
|---|---|---|
| DE | 102012025163 A1 | 6/2014 |

*Primary Examiner* — Mark A Deuble
(74) *Attorney, Agent, or Firm* — Alston & Bird LLP

(57) ABSTRACT

A goods to operator workstation is attachable to an input and a discharge conveyor system. The goods to operator workstation comprises a container staging platform that receives a product container from the input conveyor system and linearly moves the product container to an order pick position for an operator to pick articles from. A holding platform is pivotally movable between the order pick position and a discharge position to discharge a picked order container onto the discharge conveyor system after picking. Wherein when the holding platform moves back to the order pick position, the holding platform passes through the staging platform to transfer the order container from the staging platform to the holding platform so that the staging platform can retract and receive a new order container from the input conveyor system while the operator is picking.

19 Claims, 10 Drawing Sheets

(56) References Cited

U.S. PATENT DOCUMENTS

| | | | | |
|---|---|---|---|---|
| 6,468,015 B1* | 10/2002 | Konstant | ................. | B65G 1/08 |
| | | | | 193/35 MD |
| 8,713,899 B2* | 5/2014 | Hortig | ................. | B65G 1/1378 |
| | | | | 198/346 |
| 2003/0138312 A1* | 7/2003 | Watson | ................. | B65G 59/00 |
| | | | | 414/795.4 |
| 2004/0139692 A1 | 7/2004 | Jacobsen et al. | | |
| 2004/0253082 A1* | 12/2004 | Mathys | ............... | B65G 1/1378 |
| | | | | 414/280 |
| 2017/0225893 A1* | 8/2017 | Stevens | ............... | B65G 1/1378 |

\* cited by examiner

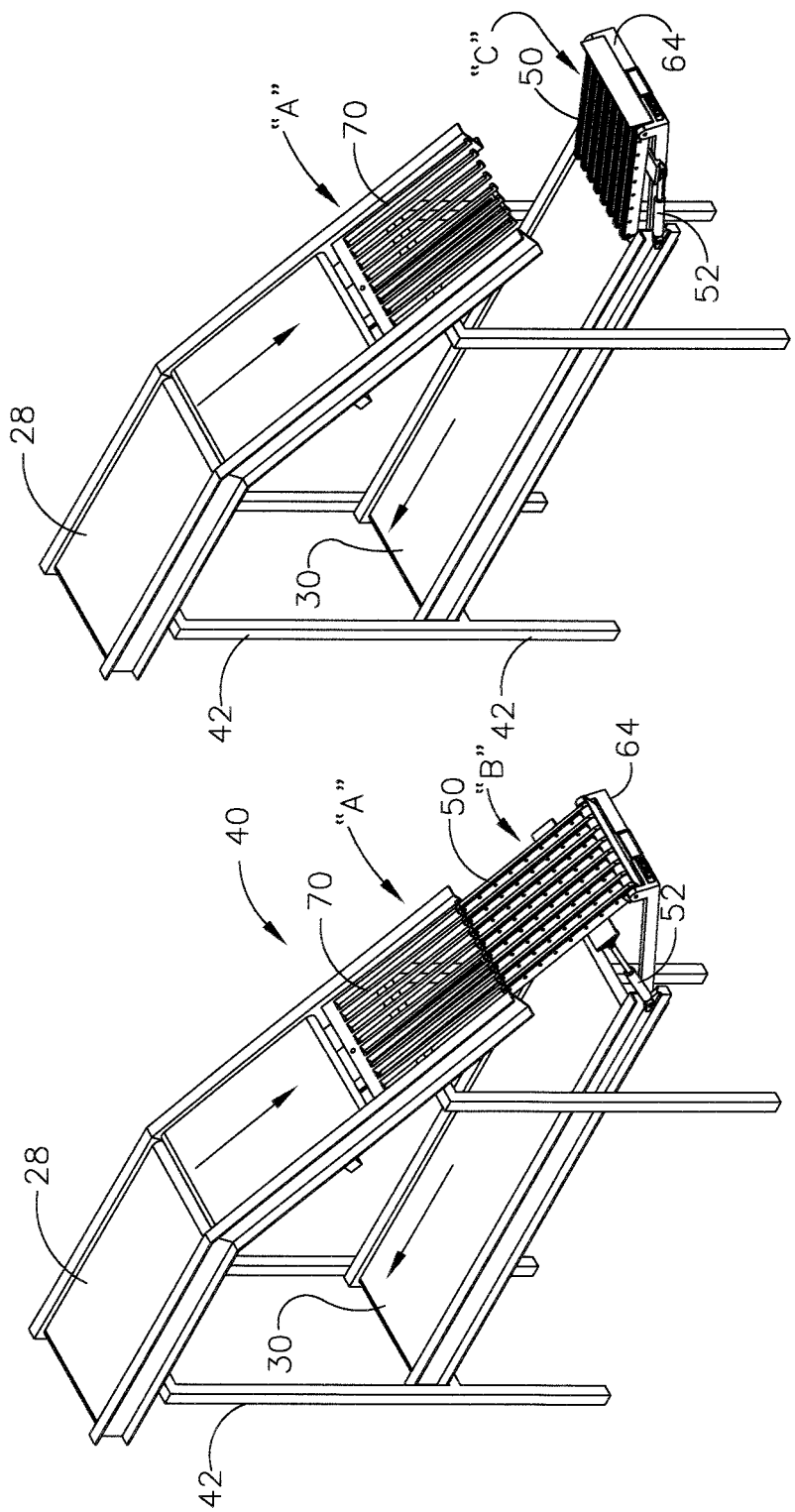

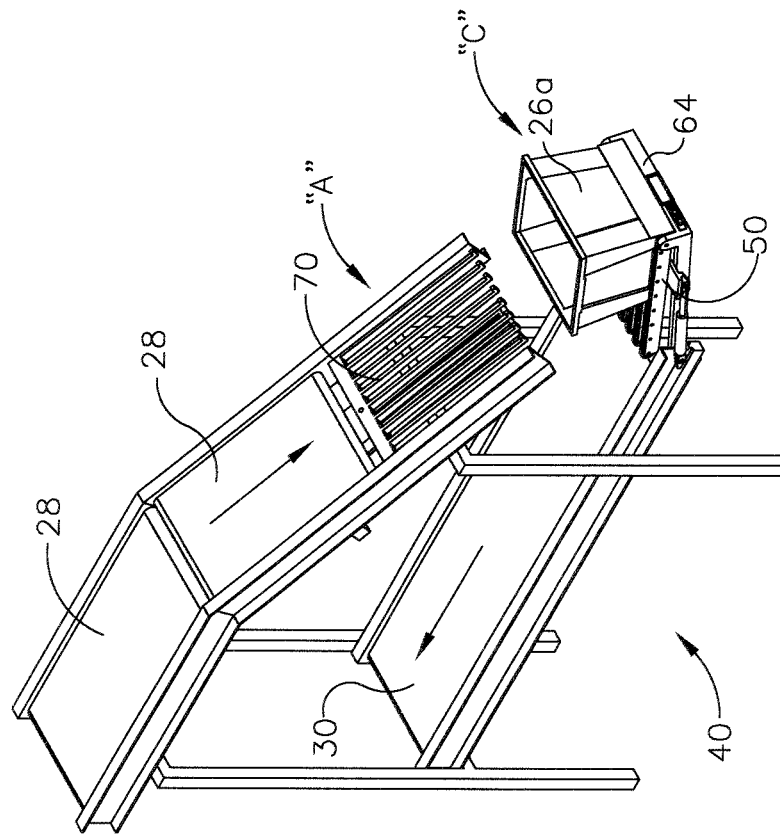
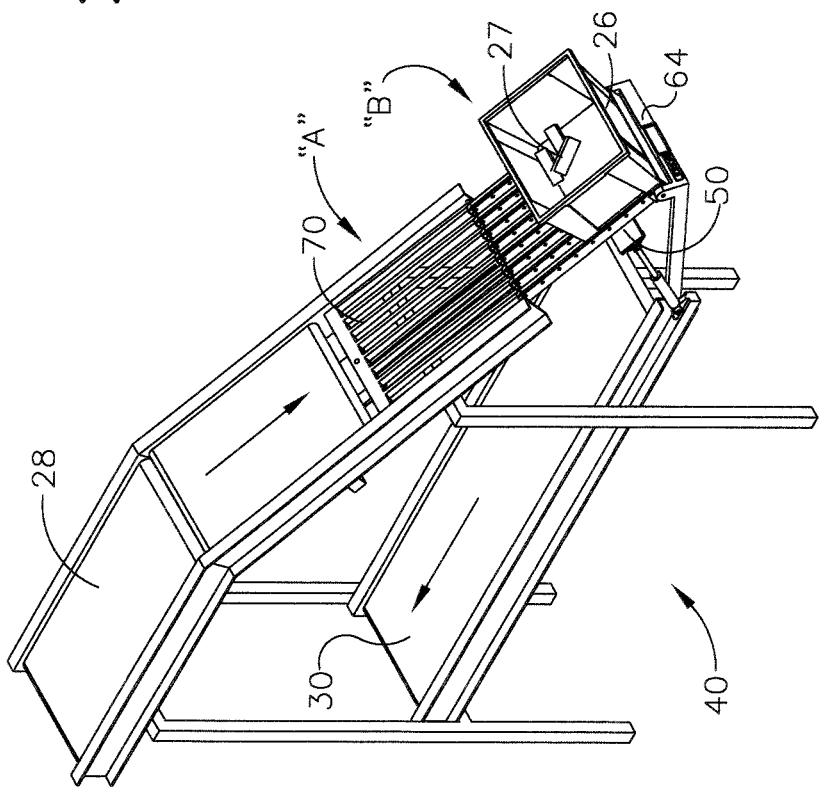

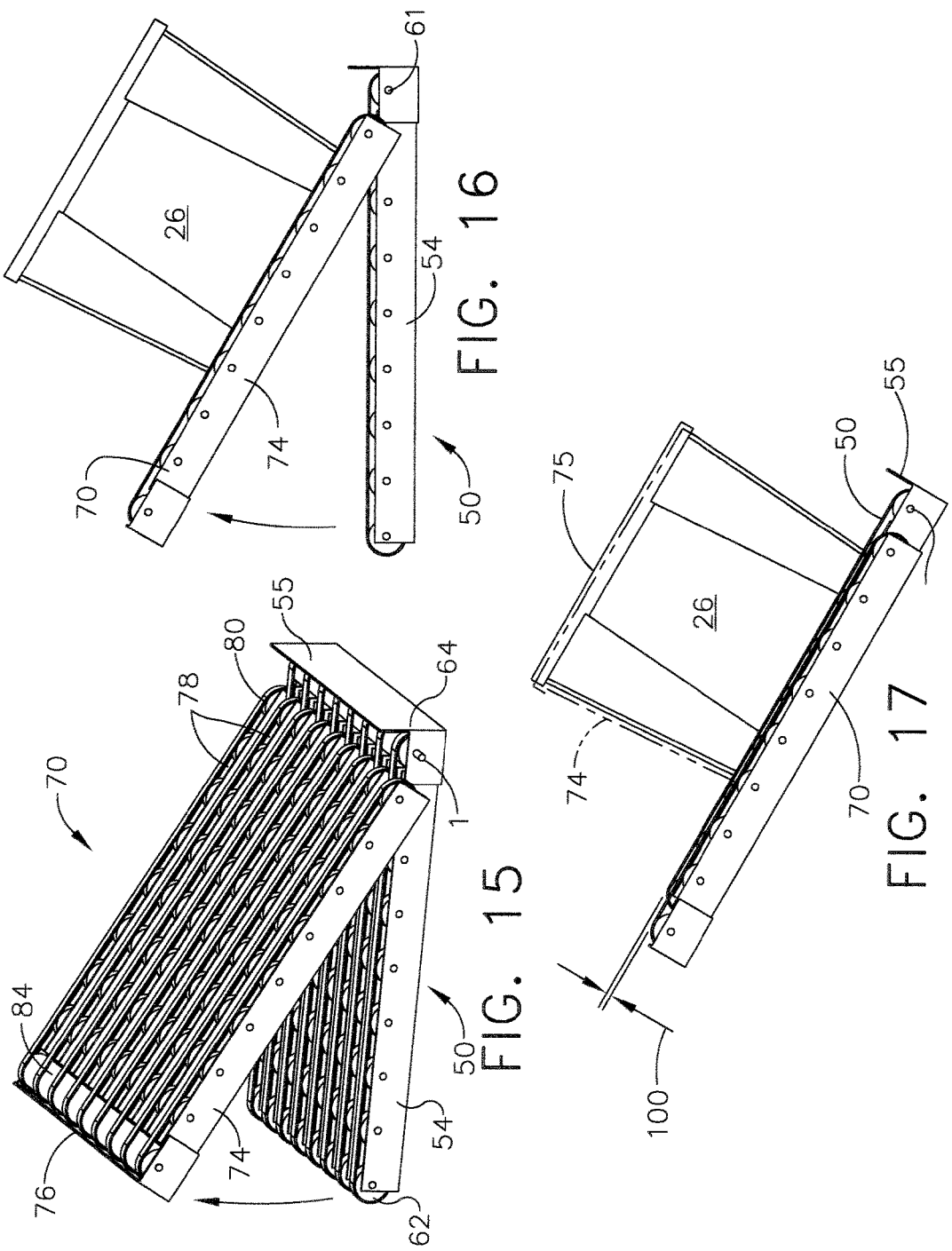

GOODS TO OPERATOR WORKSTATION

This application claims priority to U.S. Provisional Patent Application Ser. No. 62/350,709, entitled "GOODS TO OPERATOR WORKSTATION," filed on Jun. 15, 2016, the entire contents of which are incorporated by reference herein.

The present disclosure relates generally to material handling, and is more particularly directed to an order fulfillment system. The innovation will be disclosed in connection with, but not necessarily limited to, a goods to operator picking station that rapidly delivers products to an operator for order picking.

BACKGROUND

Picking stations are essential components of high volume distribution and fulfillment operations. For years, the usual method of order picking was a solution that required an order picker to take an order list, walk through racks of products filled with containers of products to pick from, picking the listed products from product containers, and placing the picked products into an order container for delivery to packaging. This solution has some downfalls: it is slow, requires intensive manpower, and is costly.

In the simplest form, an order picking system may be a pair of parallel roller conveyors, one with product totes to pick from, and one with order totes for placing the picked articles into. Early systems were heavily depended on the skills of the picker to correctly pick and place the correct quantities of articles into the correct order container and may have required manual movement of both product and order totes on the conveyors. While faster than walking rack aisles, the process was still time consuming and depended heavily on the skills of the picker or operator to correctly match picked articles with order totes.

Automating the picking process can reduce time, manpower, and costs. An automated system can bring the product containers to the picker for picking, return the product containers to storage, and deliver the filled orders to packing and shipping.

More recent order picking systems have become more robotic and automatically delivered the correct product totes sequentially to an operator standing at an order picking station for order picking. Depending on the overall robotic warehouse system design and particularly on the order picking station design, some systems deliver product containers to the operator faster than others. Time motion studies have indicated that many operators can pick faster than the order picking station can deliver, and that many of the time delays are inherent in the design of the order picking station.

Consequently, a significant need exists for an order picking station, or goods to operator station that can operate at speeds as fast or faster than the picker. Such a system would reduce order costs, deliver orders to the customer faster, and reduce the manpower involved.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the subject innovation, a goods to operator workstation is attachable to an input and a discharge conveyor system with the input conveyor system for selectively delivering product containers to pick from, and the discharge conveyor system for taking away picked product containers. The goods to operator workstation comprises a workstation structure and a container staging platform attached to the workstation structure by a linear actuator. The container staging platform is linearly movable with the linear actuator from a retracted position to receive product containers selectively dispensed from an end of the input conveyor system, to an extended position to hold the product container at an order pick position. The product container is easily accessible to the operator at the order pick position.

A holding platform is pivotally attached to the workstation structure. The holding platform comprises a plurality of strip belts driven by a motor and includes a lift mechanism connected between the workstation structure and the holding platform. The holding platform is selectively pivotally movable with the lift mechanism between a discharge position to discharge picked containers onto the discharge conveyor with the strip belts, and the order pick position.

Wherein when the container staging platform and a product container thereon is extended to the order pick position, and the holding platform pivots up to the order pick position, the holding platform pivotally moves through the extended container staging platform without contact therewith and transfers the holding of the product container from the container staging platform to the holding platform.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE FIGURES

FIG. 2 illustrates an isometric view of the goods to operator workstation of FIG. 1 with a retracted container staging platform extending downwards at an angle from the input conveyor and with a pivotally movable holding platform shown at an order picking position "B" at a front of the goods to operator workstation and with the order container delivery and removal subsystem shown removed.

FIG. 3 illustrates an isometric view of the goods to operator workstation of FIG. 2 with the holding platform pivoted downward to a discharge position.

FIG. 6 illustrates an isometric view of the goods to operator workstation of FIG. 5 with the holding platform pivoted up to the order pick position through the container staging platform to support a product container therewith.

FIG. 7 illustrates an isometric view of the goods to operator workstation of FIG. 6 with the holding platform and picked product container pivoted down to the discharge position.

FIG. 15 illustrates an isometric view of the holding platform and the container staging platform while the holding platform is pivoting up through the container staging platform.

FIG. 16 illustrates a side view of FIG. 15.

FIG. 17 illustrates a side view of FIG. 15 after the holding platform has pivoted through the container staging platform to lift the product container from the container staging platform to a new position where the product container is supported on the holding platform.

DETAILED DESCRIPTION

Figure 1:
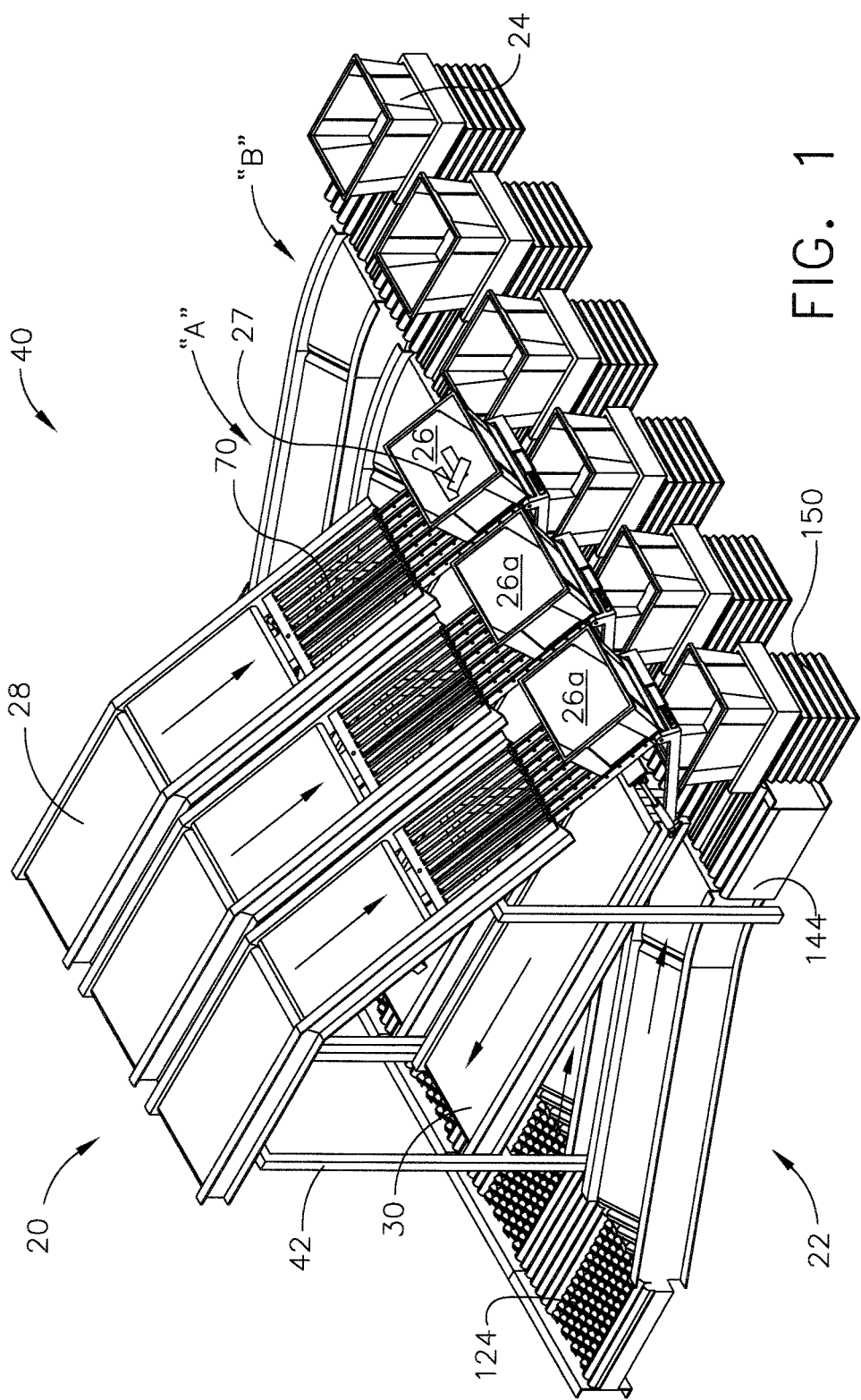
FIG. 1 illustrates a front isometric view of a goods to operator workstation connected to an input conveyor system and a discharge conveyor system with an order container system located beneath.

Referring initially to the drawings, FIG. 1 illustrates an order fulfillment system 20 comprising an order container system 22 and a goods to operator workstation 40 of the present innovation. The order container system 22 delivers empty customer order containers 24 to the goods to operator workstation 40, and after an order is fulfilled, conveys filled order containers to shipping. The goods to operator workstation 40 connects to an article storage area (not shown) such as a warehouse or ASRS storage system through an input conveyor system 28 that delivers unpicked product containers 26 to the goods to operator workstation 40, and by a discharge conveyor system 30 that returns picked product containers 26 back to the article storage area for future orders. Each unpicked product container 26 contains articles 27 pickable for customer orders, and each picked product container 26a contains a lesser number of articles after one or more articles 27 were picked for a customer order. The goods to operator workstation 40 receives an unpicked product container 26 from input conveyor system 28, moves the product container 26 and items 27 contained therein to an order picking position "B" for easy operator picking, and after picking, discharges the picked product container 26a onto the discharge conveyor system 30. The goods to operator workstation 40 of the present innovation is designed to rapidly move product containers 26 to an order picking position "B" and is designed to rapidly remove picked product containers 26a from the order picking position "B" shown in FIG. 1, and to discharge picked product containers 26a from the order picking position "B" onto the discharge conveyor system 30. The goods to operator workstation 40 of the present innovation is intended to reduce operator wait time, and may in some instances, operate as fast or faster than the operator or picker.

Figure 2A:
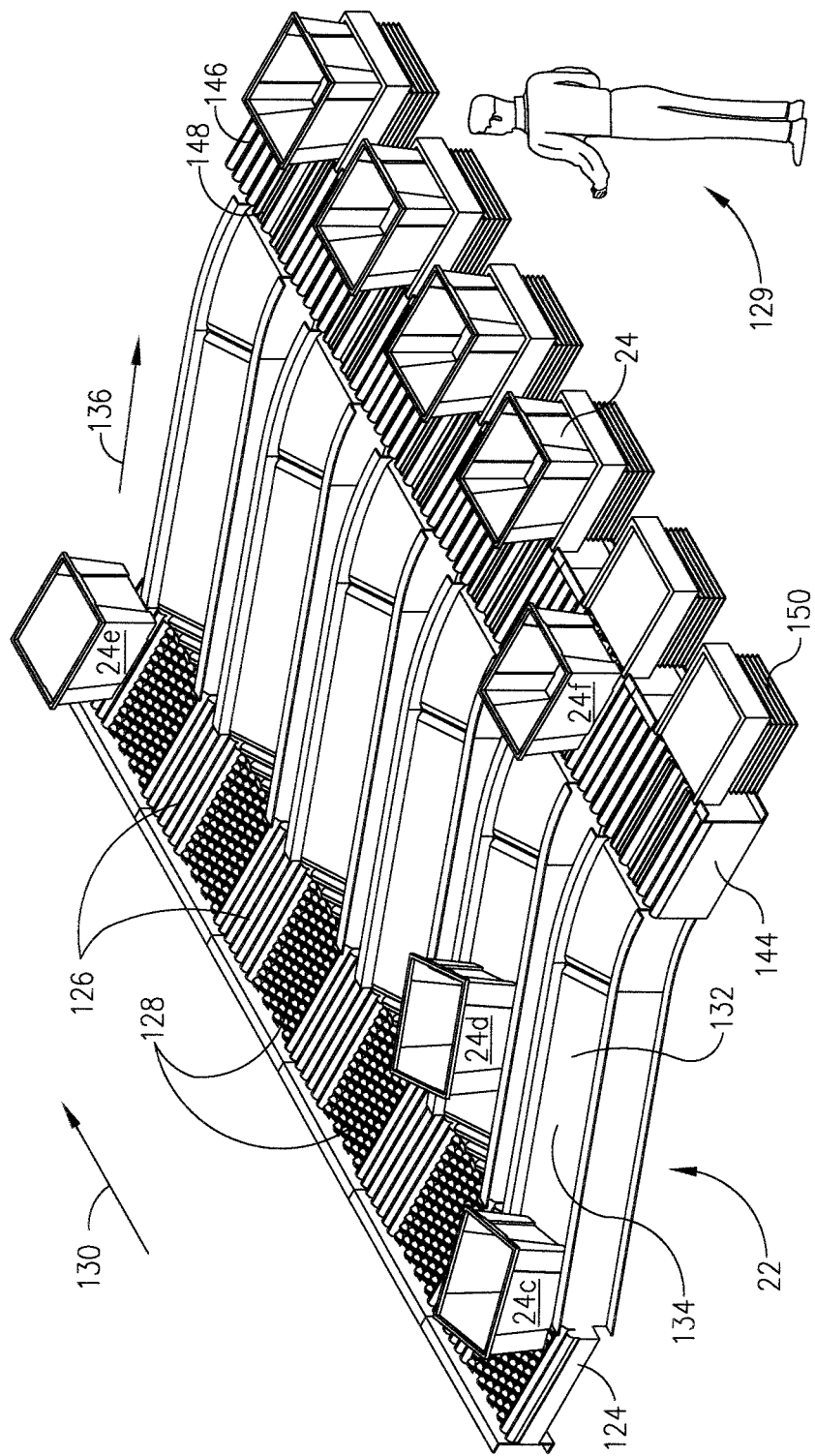
FIG. 2A illustrates an isometric view of the order container system of FIG. 1.
Figure 4:
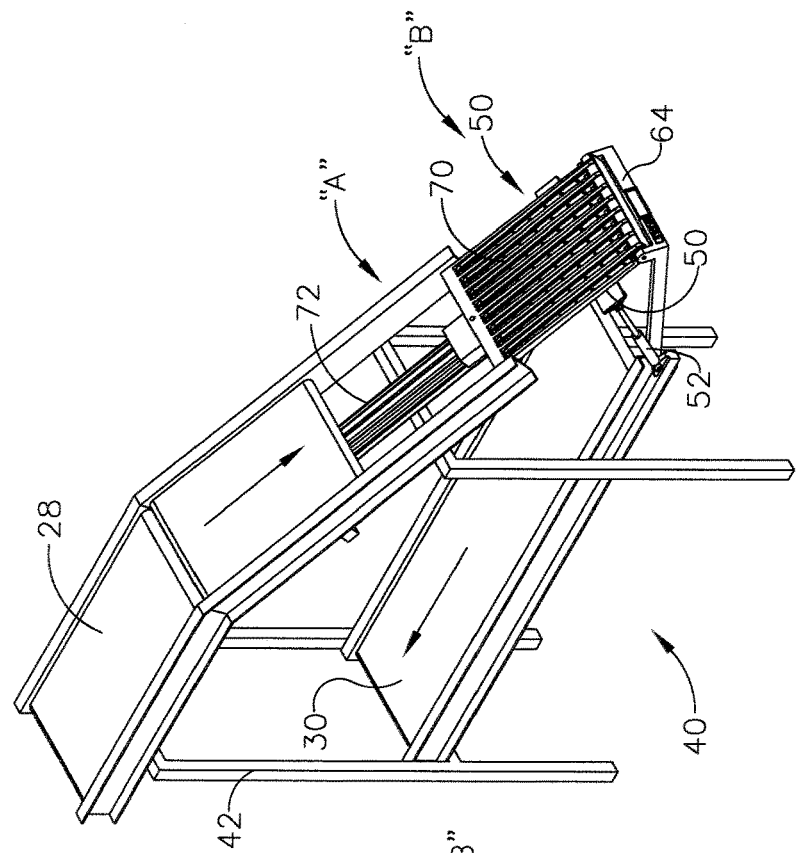
FIG. 4 illustrates an isometric view of the goods to operator workstation of FIG. 3 with the holding platform pivoted downward to a discharge position and with the container staging platform extended to the order picking position.

As shown in FIGS. 1 and 2A, the order container system 22 delivers empty customer order containers 24 to the order fulfillment system 20, and carries away filled order containers to shipping. FIG. 2A illustrates a ground level version of the order container system 22 but is not limited thereto. Order container system 22 may comprise a parallel input conveyor 124 and a parallel exhaust conveyor 144, both of which can convey in the same direction. Input conveyor 124 may comprise alternating roller sections 126 and wheeled divert sections 128. Roller sections 126 convey articles in the direction shown by arrow 130. Angled divert lanes 132 can comprise powered wide belt conveyors 134 or rollers that can receive and convey empty customer order containers 24 towards the operator in the direction of arrow 136. Each angled divert lane 132 can convey empty customer order containers 24 to a goods to operator workstation 40. As shown in FIG. 2A, empty customer order container 24c is being diverted onto an angled divert lane 132, empty customer order container 24d is being conveyed on another angled divert lane 132 towards the operator, empty customer order container 24e is being conveyed along input conveyor 124 in the direction of arrow 130, and empty customer order container 24f is being conveyed in the direction of arrow 130 on exhaust conveyor 144. Exhaust conveyor 144 can comprise a section of powered roller conveyors 146 alternating with a plurality of right angled transfer units 148 (RAT) along the length thereof. Each right angled transfer 148 is well known in the art and can have rollers to convey in the direction of arrow 130 and can include pop-up belt drives that pop up between the rollers to drive a container towards or away from an operator 129. Each of the right-angled transfer units 148 is positioned at a goods to operator workstation 40 and moves an empty customer order container 24 onto a vertically movable pedestal 150 of a respective each goods to operator workstation 40. As shown in FIG. 1, each pedestal 150 moves an empty customer order container 24 up to within easy reach of the operator, and can drop the filled order containers down to the near floor level of the order container system 22 after the order is picked. When an order is filled, the operator can activate a switch such as button 168 (see FIG. 18) to drop the pedestal 150 and the filled order container down next to a respective right angle transfer 148. Right angle transfer 148 is energized at that time to pull the filled order container onto the exhaust conveyor 144. To initiate the pulling action, the operator or the pedestal 150 can push the filled order container into engagement with the energized respective right angle transfer 148 for conveyance away on the exhaust conveyor 144. In FIG. 2A, the filled order container 24*f* is conveyed by exhaust conveyor 144 towards shipping in the direction of arrow 130.

The goods to operator workstation 40 of the present embodiment will be described as being attached to an input conveyor 28 and discharge conveyor system 30, but is not limited thereto. Arrows are provided to indicate direction of flow of product containers 26, 26*a* moving through the goods to operator workstation 40.

Figure 18:
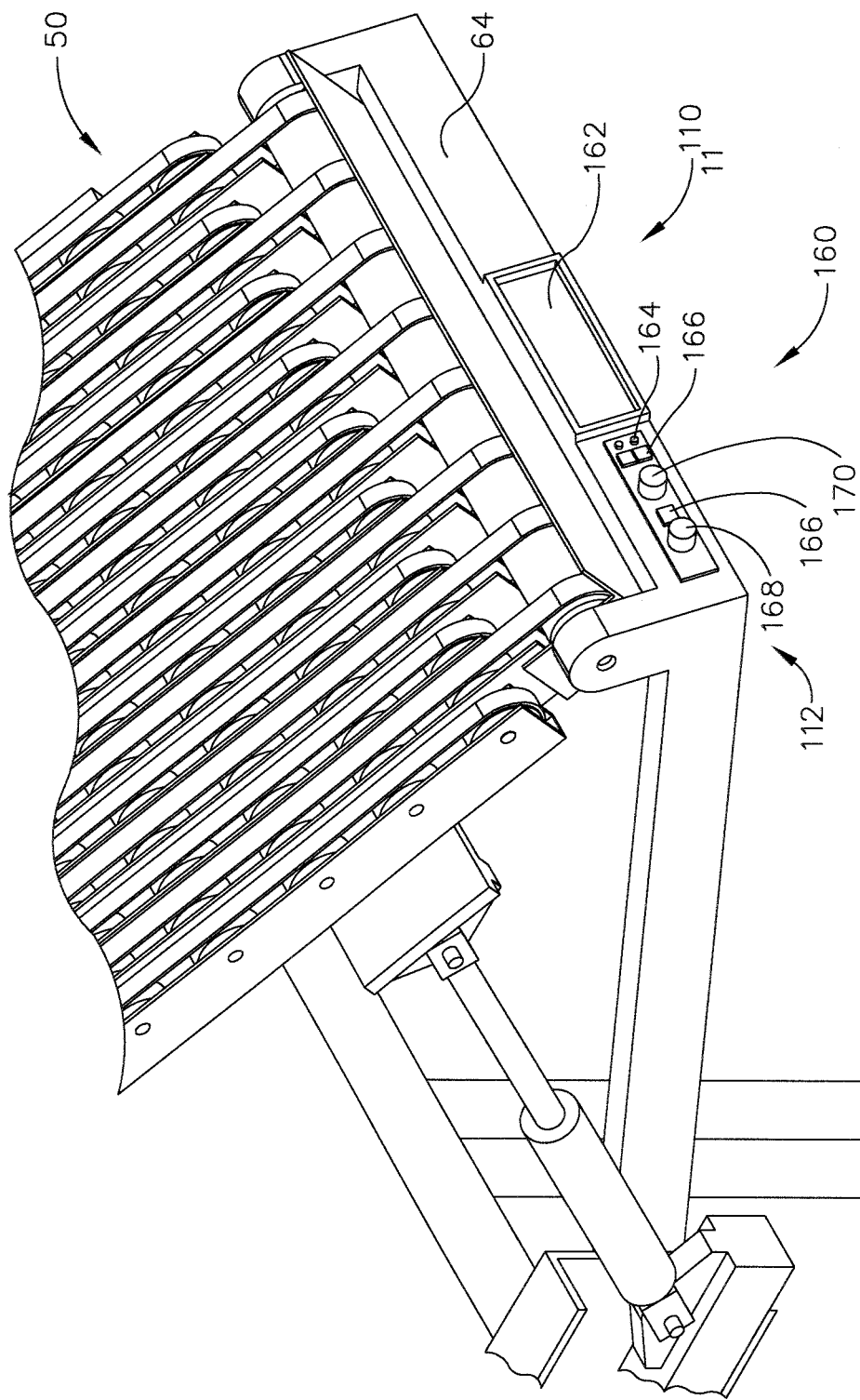
FIG. 18 illustrates an isometric view of a portion of FIG. 1 showing a control panel provided at an operator pick area adjacent to one or more of each product container and each order container. control panel at an operator pick area.

The order fulfillment system 20 can comprise a control system 110 (FIG. 18) such as a computer, a microprocessor, and the like to control the delivery and takeaway of product containers 26 to the goods to operator workstation 40, and can control the timing and sequencing of product containers 26 through the goods to operator workstation 40 as they are presented to the operator for picking. Additionally, the control system 110 can control the order container system 22 to ensure delivery of empty order totes to each and every goods to operator workstation 40, and can ensure that the filled order container are dispatched to shipping. Alternate duties of the control system 110 can be traffic flow control of multiple product containers 26 through the order container system 22 and through the goods to operator workstation 40. One or more controls 112 can be provided for each goods to operator workstation 40 to activate an automated cycle that removes a product container 26 from the order picking position "B", discharges the product container 26 onto discharge conveyor system 30 for takeaway, and moves a new product container 26 to the order picking position "B". Likewise, a similar automated process and control can be used with the order container system 22 to provide an empty order container 24 for an order, to hold the order container during fulfillment, to take the filled order container away for packaging and mailing, and to place a new empty order container 24 in place. FIG. 18 illustrates a control panel 160 provided at the operator pick area adjacent to one or more of each product container 26 and each order container 24. Control panel 160 may comprise a visual display screen 162 or touch screen showing pick quantities of item 27 and the appropriate order container 24 in which to place the articles 27 into. The control panel 160 may also comprise colored lights 164 or audible signals or numeric counters or indicators 166 to indicate pick quantities and order completion. One or more controls such as a button 168 can be provided to initiate the replacement of the picked product containers 26*a* with an unpicked product tote 26, and button 170 can be used to discharge a fulfilled customer order container from the operator workstation 40 to shipping and to insert an empty customer order container 24.

FIGS. 2-11 show the goods to operator workstation 40 with the order container system 22 removed for clarity and with the goods to operator workstation 40 attached to input conveyor system 28 and discharge conveyor system 30. A workstation structure 42 can be constructed from tubes to support the mechanisms and conveyors of the goods to operator workstation 40 and to interconnect to input and discharge conveyor systems 28, 30. Holding platform 50 is pivotally attached to a front of the workstation structure 42 and is pivotally movable with a lift mechanism 52 thereof back and forth between the order picking position "B" shown in FIG. 2 to a discharge position "C" shown in FIG. 3.

Figure 5:
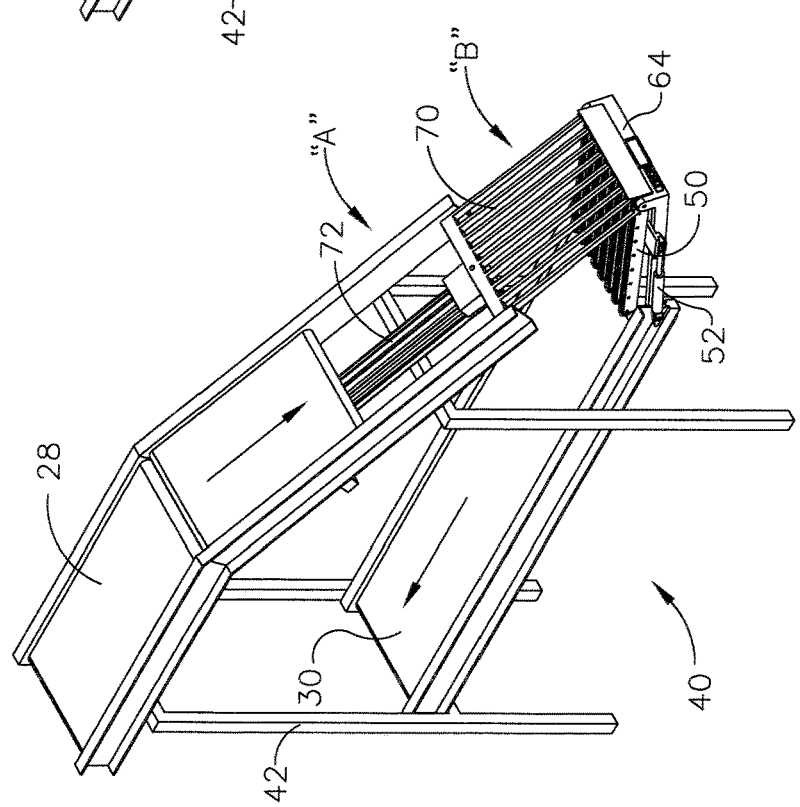
FIG. 5 illustrates an isometric view of the goods to operator workstation of FIG. 4 with the holding platform pivoted to the order pick position through the container staging platform.
Figure 9:
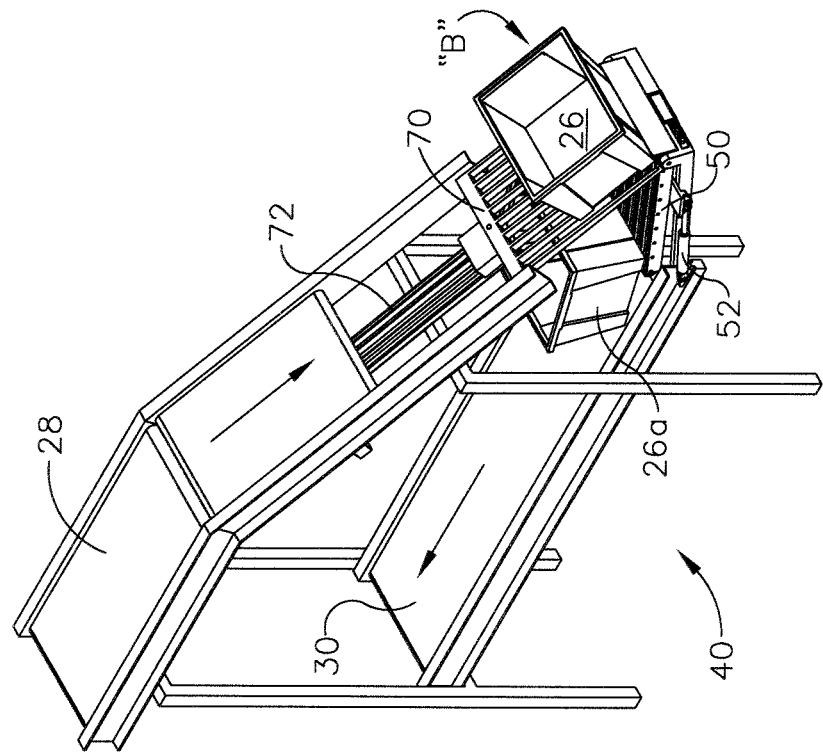
FIG. 9 illustrates an isometric view of the goods to operator workstation of FIG. 8 with the holding platform pivoted downward to discharge the picked product container onto the discharge conveyor system with the container staging platform and new product tote extended to the order pick position.
Figure 10:
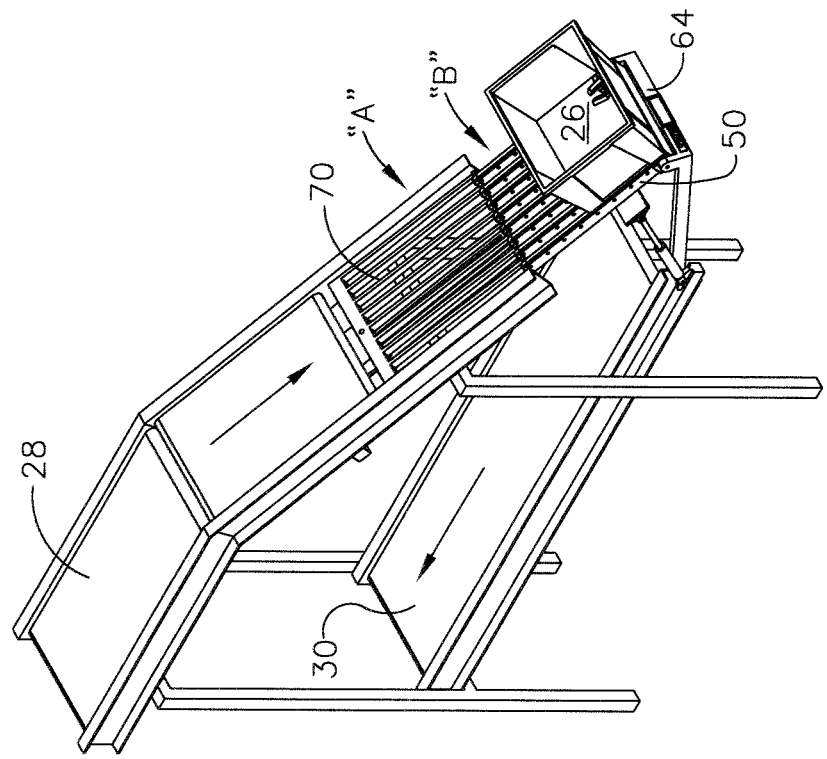
FIG. 10 illustrates an isometric view of the goods to operator workstation of FIG. 9 with the holding platform pivoted up to the order pick position through the container staging platform to support a product container therewith.

A fingered container staging platform 70 is shown in a staging or retracted position "A" in FIGS. 2-3, 6-8, and 11. Container staging platform 70 is attached to workstation structure 42 by a linear actuator 72 to position container staging platform 70 adjacent to an end of the input conveyor system 28 to receive product containers 26 therefrom. Linear actuator 72 can be a lead screw, a fluidic actuator, an electric actuator, a linkage, a gear train, belt drive or any other mechanism to linearly move container staging platform 70. FIGS. 4-5, 9, 10, and 14-17 shows the container staging platform 70 in an at least a partially extended position extending into the order picking position "B". In FIGS. 5, 10 and 17, both the holding platform 50 and the container staging platform 70 are in the order picking position "B" with the holding platform 50 moved through the container staging platform 70 without contact therewith. This will be explained in detail later.

Container staging platform 70 pivotally attaches to workstation structure 42, may be inclined as shown, and is configured to speed up the operation of the goods to operator workstation 40 by operating separately and independently from the holding platform 50. Container staging platform 70 can pre-stage an order container selectively received form the input conveyor system 28 on the container staging platform 70 ready for rapid placement. When the order picking position "B" is clear, the container staging platform 70 moves the pre-staged order container 26 thereon into the order pick position with the linear actuator 72. Linear movement of the container staging platform 70 and pivotal movement of the holding platform 50 can be coordinated to prevent collisions with product containers 26 and 26*a* while the holding platform 50 is pivotally moving a picked product container 26*a* from the order picking position "B" (FIG. 2) to the discharge position (FIG. 3). As will be described below, the container staging platform 70 and the holding platform 50 are configured to linearly and rotatably pass through each other without colliding.

FIGS. 6-11 illustrate the process of moving order containers 26 and picked order containers through the goods to operator workstation 40 with the holding platform 50 and the container staging platform 70. In FIG. 6, the container staging platform 70 is retracted and holding platform 50 is holding a product container 26 at the order picking position "B". In FIG. 7, articles have been picked from order container 26 to create picked order container 26*a* and holding platform is pivoted down to the discharge position to discharge the picked order container onto the discharge conveyor system for removal.

Figure 8:
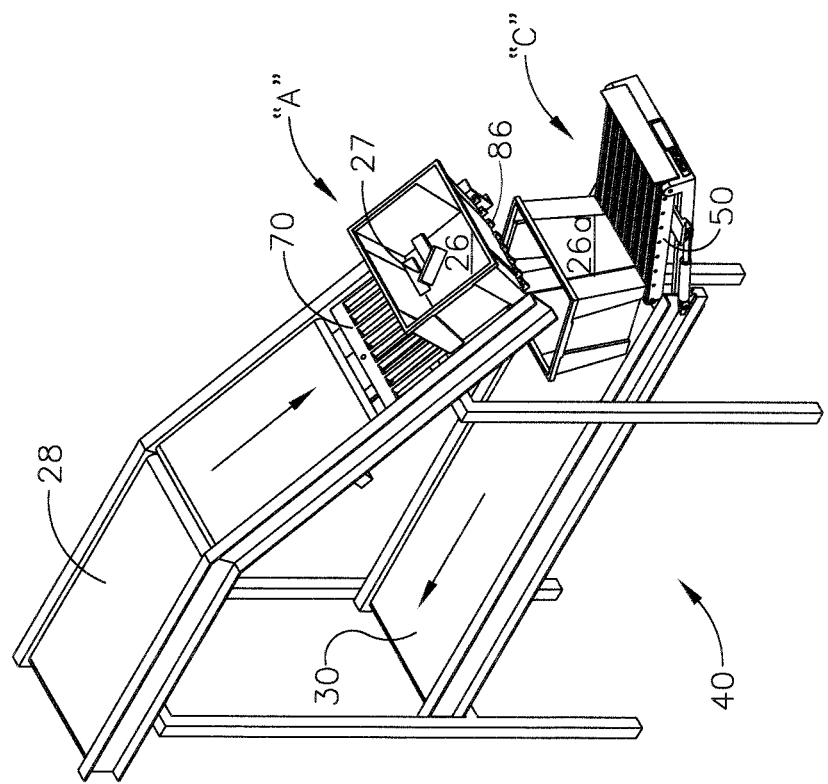
FIG. 8 illustrates an isometric view of the goods to operator workstation of FIG. 7 with the holding platform pivoted downward to discharge the picked product container onto the discharge conveyor system while a new product container has been pre-staged onto the container staging platform.
Figure 11:
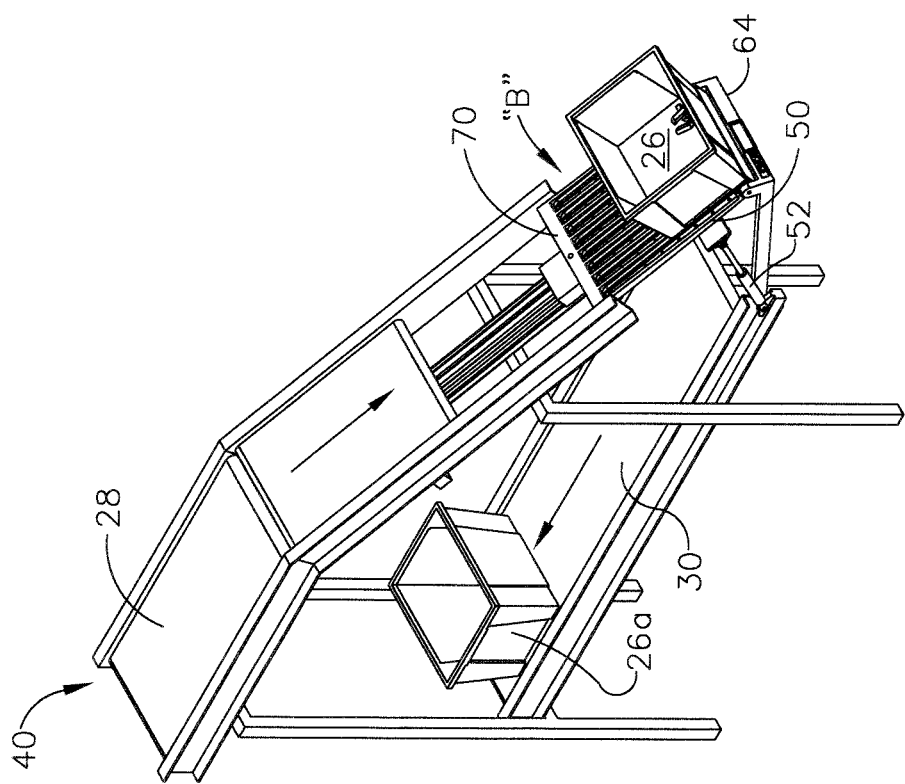
FIG. 11 illustrates an isometric view of the goods to operator workstation of FIG. 10 holding platform pivoted up to the order pick position to hold the product container at the order pick position and with the container staging platform retracted.
Figure 12:
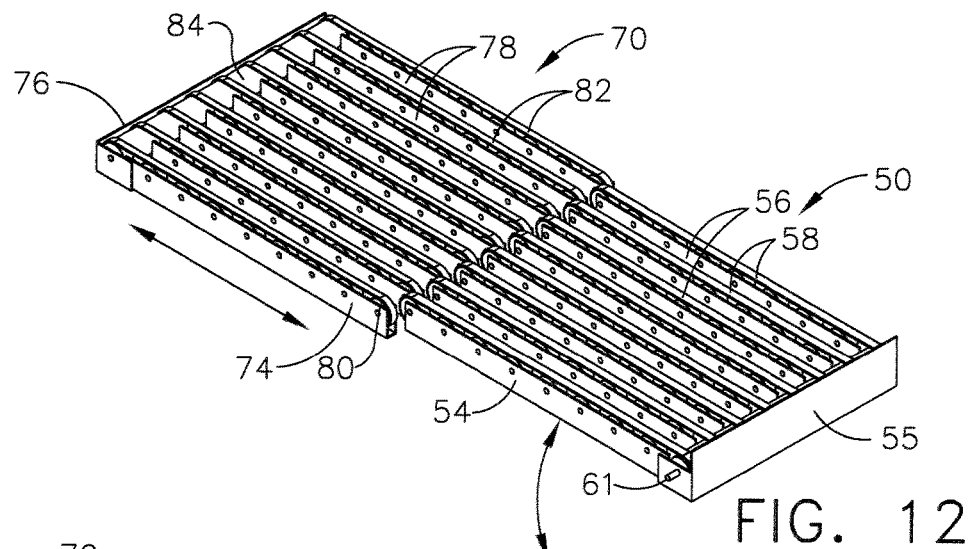
FIG. 12 illustrates an isometric view of the holding platform and the container staging platform at the positions of FIG. 2.

In FIG. 8, the input conveyor 28 has pre-staged a new product container onto the retracted container staging platform 70 while the picked order container 26*a* is being discharged onto discharge conveyor system 30. In FIG. 9, the container staging platform 70 is extending to place the new order container 26 at the order picking position "B" for picking as soon as the picked order container 26*a* has cleared out of the way. In FIG. 10, the holding platform 50 is swinging up to the order picking position "B". In FIG. 11, the picked order container 26*a* is shown at the end of discharge conveyor system 30 and the empty holding platform 50 has pivoted up through the container staging platform 70 to the order picking position to lift the order container 26 from the container staging platform 70. The order container 26 is now held by the holding platform 50 at the order picking position "B" and the container staging platform 70 is retracted to retracted position "A" to get a new order container 26 from input conveyor system 28.

The holding platform 50 is shown enlarged in FIGS. 12-17 and comprises a fingered structure comprising a plurality of parallel and spaced apart fingers 54. Lift mechanism 52 is removed in FIGS. 12-17 for clarity. Each finger 54 can have a "U" shape and forms the fingered structure by attachment at one end to an attachment end 55. A uniform gap 56 extends between adjacent fingers 54 leaving the fingers 54 as cantilevers extending from the attachment end 55 as a fingered structure. Each finger 54 can include a strip belt 58 exposed at a top of the "U" shape with each strip belt 58 operatively supported at one end by a drive roller 60 and by idler pulley 62 at the other and may include support pulleys 63 under the belt between the motor 56 and idler pulley 62 (See FIGS. 12-17). Drive roller 60 can comprise a motor driven roller and may be driven in embodiments by a motor other than the motor driven roller. Stops 86 (see FIG. 8) may be provided at free ends of one or more staging fingers 74 to prevent product containers from sliding off of the inclined container staging platform 70. Stops 86 may be configured to fold down when the container staging platform 70 is at the order picking position "B". The holding platform 50 can pivotally attach to a holding platform bracket 64 that attaches at a front of the workstation structure 42. As shown in FIGS. 15-17, holding platform 50 can pivot around a shaft 61 of the drive roller 60.

The container staging platform 70 is shown enlarged in FIGS. 12-17 and comprises a fingered structure having plurality of staging fingers 74 extending in parallel from a staging attachment end 76. Staging fingers 74 extend as cantilevers from staging attachment end 76 with uniform staging gaps 78 between adjacent staging fingers 74. Each staging finger 74 can include a staging idler 80 at a free end of staging finger 74, and a staging strip belt 82 mounted thereon. Each strip belt 82 can be driven by a staging roller 84 adjacent to the staging attachment end 76. Staging roller 84 can comprise a motor driven roller and may be driven in embodiments by a motor other than the motor driven roller. In an alternate embodiment, the staging fingers 74 are solid cantilever members without strip belts 82 (see FIGS. 1-11.

Figure 13:
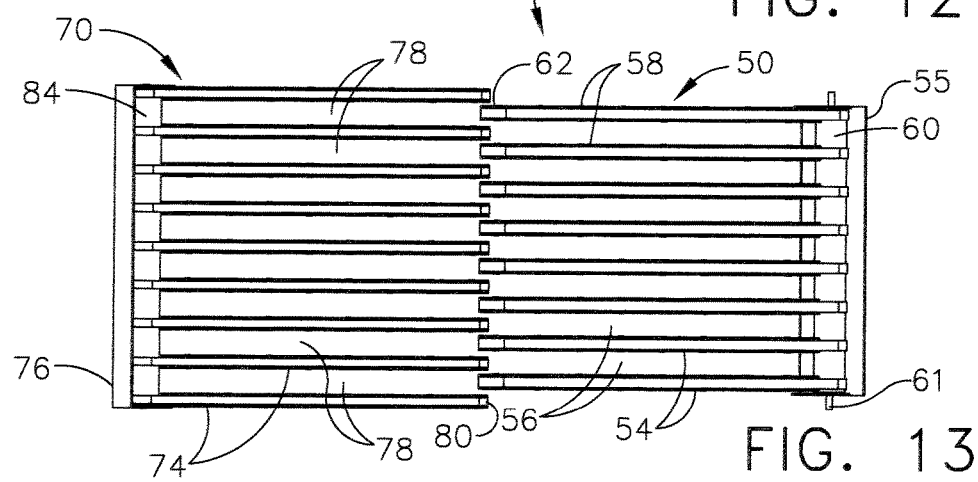
FIG. 13 illustrates a top view of the holding platform and the container staging platform at the positions of FIG. 2.
Figure 14:
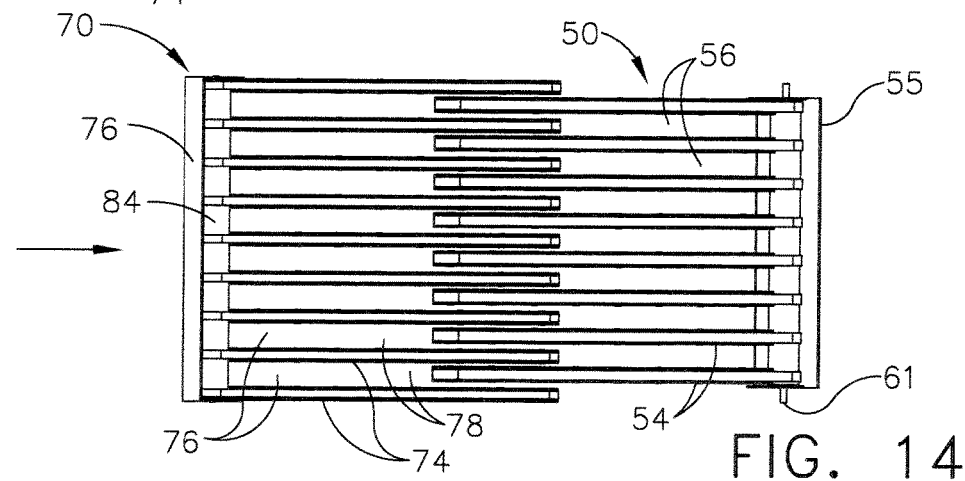
FIG. 14 illustrates a top view of the holding platform and the container staging platform of FIG. 13 with the container staging platform moving linearly into the holding platform.

FIG. 13 shows a top view of the holding platform 50 and the container staging platform 70 in the end to end position of FIG. 2. FIG. 14 shows the container staging platform 70 moving linearly (see arrow) in response to the linear actuator 72. FIG. 14 shows the staging fingers 74 of the container staging platform 70 interleaving (without touching) with the holding platform 50 by moving into the gaps 56. As the container staging platform 70 moves, the fingers 54 of the holding platform 50 also interleave without touching by moving into the holding gaps 78 of the container staging platform 70. Note that there is one more staging finger 74 than fingers 54 so that fingers 54 can pass unobstructed through gaps 78 between staging fingers 74 to thereby pass the holding platform 50 through the container staging platform 70.

FIGS. 15-17 depict the process whereby the holding platform 50 swings up from the discharge position through the staging platform to the order pick position. In FIG. 15, the fingers 54 of the holding platform 50 are swinging upwards through the holding gaps 78 between the staging fingers 74 of the container staging platform 70. In FIG. 16, an order container 26 is held at the order pick position on staging strip belts 82 of the staging fingers 54. In FIG. 17, the holding platform 50 has swung up to the order pick position for the holding platform 50. As the holding platform 50 pivoted to the order pick position, the fingers 54 of the holding platform 50 lifted the order container 26 from resting on the staging fingers 74 to resting on the fingers 54 of the holding platform 50. The repositioning of the order container 26 from resting on staging fingers 74 to resting on fingers 54 moves the order container 26 upwards slightly an amount designated as 100 and decouples the order container 26 from the container staging platform 70. Once the order container 26 is decoupled from the container staging platform 70, the staging platform 70 can be moved back to the retracted position "A" adjacent to input conveyor system 28 to pre-stage a new order container 26 received from input conveyor system 28.

While the present embodiment of the invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

For example, in the above description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. In the above described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A goods to operator workstation for receiving an unpicked product container from an input conveyor system, moving the unpicked product container and items contained therein to an order picking position for operator picking, and after picking, discharging a picked product container onto a discharge conveyor system, the goods to operator workstation comprising:
    a workstation structure;
    a container staging platform attached to the workstation structure by a linear actuator and linearly movable from a retracted position adjacent to an end of the input conveyor system to receive unpicked product containers therefrom to an extended order picking position adjacent to the operator for operator picking from the unpicked product container; and
    a holding platform pivotally attached to the workstation structure pivotally movable back and forth between the order picking position for operator picking from the unpicked product container and a discharge position to discharge the picked product container onto the discharge conveyor system for removal,
    wherein the holding platform comprises a fingered structure comprising a plurality of spaced apart fingers with each finger comprising a strip belt operatively connected to one end by a drive roller, wherein the holding platform pivots about a shaft of the drive roller, and
    wherein the container staging platform and the holding platform are configured to linearly and rotatably pass through each other without colliding when transferring the unpicked product container from the container staging platform to the holding platform at the order picking position.

2. The goods to operator workstation of claim 1 wherein when the unpicked product container is transferred from the container staging platform to the holding platform, the holding platform is higher than the container staging platform.

3. The goods to operator workstation of claim 1 further comprising a lift mechanism operably connecting between the workstation structure and the holding platform to pivotally move the holding platform back and forth between the order picking position and the discharge position.

4. The goods to operator workstation of claim 3 wherein the lift mechanism comprises at least one extendable and retractable cylinder.

5. The goods to operator workstation of claim 1 wherein the plurality of spaced apart fingers extends as a "U" shape.

6. The goods to operator workstation of claim 5 wherein each of the "U" shaped spaced apart fingers comprises the strip belt exposed at a top of the "U" shape operatively supported at one end by the drive roller and at another end by an idler pulley.

7. The goods to operator workstation of claim 1 wherein the linear actuator linearly movably attaching the container staging platform to the workstation structure comprises a lead screw.

8. The goods to operator workstation of claim 1 wherein the linear actuator linearly movably attaching the container staging platform to the workstation structure comprises a fluidic actuator.

9. The goods to operator workstation of claim 1 wherein the linear actuator linearly movably attaching the container staging platform to the workstation structure comprises an electric actuator.

10. The goods to operator workstation of claim 1 wherein the linear actuator linearly movably attaching the container staging platform to the workstation structure comprises a linkage.

11. The goods to operator workstation of claim 1 wherein the linear actuator linearly movably attaching the container staging platform to the workstation structure comprises a gear train.

12. The goods to operator workstation of claim 1 wherein the linear actuator linearly movably attaching the container staging platform to the workstation structure comprises a belt drive.

13. The goods to operator workstation of claim 1 wherein the container staging platform comprises a motor driven strip belt on each finger to support and move product containers thereon.

14. The goods to operator workstation of claim 2 wherein the container staging platform comprises fingers comprising a solid cantilever member.

15. A goods to operator workstation for receiving an unpicked product container from an input conveyor system, moving the unpicked product container and items contained therein to an order picking position for operator picking, and after picking, discharging a picked product container onto a discharge conveyor system, the goods to operator workstation comprising:

a workstation structure;

a container staging platform attached to the workstation structure by a linear actuator and linearly movable from a retracted position adjacent to an end of the input conveyor system to receive unpicked product containers therefrom, and linearly movable to an extended order picking position for order picking; and a holding platform pivotally attached to the workstation structure, pivotally movable with a lift mechanism thereof back and forth between the order picking position for operator picking and a discharge position to discharge the picked product container onto the discharge conveyor system for removal, wherein the container staging platform and the holding platform comprise fingered structures having gaps between fingers and the container staging platform, wherein when the holding platform pivotally moves to the order picking position and the container staging platform is at the order picking position, the holding platform and the container staging platform interleave together without touching when the holding platform moves through the gaps of the container staging platform, and wherein each finger comprises a strip belt operatively connected to one end by a drive roller, wherein the holding platform pivots about a shaft of the drive roller.

16. The goods to operator workstation of claim 15 wherein the holding platform comprises a motor driven strip belt on each finger to support and move product containers thereon.

17. The goods to operator workstation of claim 15 wherein the container staging platform comprises a motor driven strip belt on each finger to support and move product containers thereon.

18. The goods to operator workstation of claim 15 wherein the fingers of the fingered structures of the container staging platform and the holding platform comprise a solid member.

19. The goods to operator workstation of claim 15 wherein the fingers of the fingered structures of the container staging platform and the holding platform comprise cantilevers.

* * * * *